United States Patent [19]
Blum et al.

[11] Patent Number: 5,493,003
[45] Date of Patent: * Feb. 20, 1996

[54] SOLUTIONS OF POLYIMIDE-FORMING SUBSTANCES AND THEIR USE AS COATING MATERIALS

[75] Inventors: Rainer Blum, Ludwigshafen; Manfred Schwarz, Gröbenzell; Gerhard Hoffmann, Otterstadt, all of Germany

[73] Assignee: BASF Lacke + Farben Aktiengesellschaft, Muenster, Germany

[ * ] Notice: The portion of the term of this patent subsequent to Dec. 26, 2012, has been disclaimed.

[21] Appl. No.: 320,319

[22] Filed: Oct. 11, 1994

[30] Foreign Application Priority Data

Oct. 18, 1993 [DE] Germany .................. 43 35 323.1

[51] Int. Cl.⁶ .................. C08G 69/26; C08G 73/10
[52] U.S. Cl. .................. 528/353; 528/125; 528/128; 528/170; 528/172; 528/173; 528/176; 528/188; 528/220; 528/229; 524/379; 524/391; 524/600; 524/606; 524/607

[58] Field of Search .................. 528/26, 353, 125, 528/128, 170, 173, 172, 176, 188, 220, 229; 524/600, 606, 607, 391, 379

[56] References Cited

U.S. PATENT DOCUMENTS

| | | | |
|---|---|---|---|
| 5,252,403 | 10/1993 | Blum et al. | 428/447 |
| 5,264,545 | 11/1993 | Blum et al. | 528/353 |
| 5,332,799 | 7/1994 | Blum et al. | 528/353 |

FOREIGN PATENT DOCUMENTS

271736  1/1991  European Pat. Off. .

*Primary Examiner*—P. Hampton-Hightower
*Attorney, Agent, or Firm*—Keil & Weinkauf

[57] ABSTRACT

Solutions of polyimide-forming substances contain
  A) polyamines and
  B) amides and/or esters of tetracarboxylic acids, the amido or ester groups carrying substituents selected from the group consisting of carboxyl, sulfo and silicon-containing groups,
and are used as polyimide coatings.

5 Claims, No Drawings

SOLUTIONS OF POLYIMIDE-FORMING SUBSTANCES AND THEIR USE AS COATING MATERIALS

BACKGROUND OF THE INVENTION

1. Field of the Invention

The present invention relates to solutions of polyimide-forming substances, containing A) polyamines and B) amides or esters or a mixture of amides and esters of tetracarboxylic acids, the amide or ester groups carrying substituents selected from the group consisting of carboxyl, sulfo, silyl and siloxyl groups.

The present invention furthermore relates to the use of such solutions as coating materials and to articles coated with a polyimide.

An important field of use of the polyimide coatings, which are solutions of polyimide-forming substances, is microelectronics, where polyimide coatings are used as insulation layers in the structures of microchips or as buffer layers between the finished chip and the chip housing.

2. Description of the Related Art

An important requirement for the polyimide layers is good adhesion to the base material of the chips, ie. to wafers of silicon or modified silicon. This problem has been solved to date by pretreating the inorganic substrates with adhesion promoters, for example aminoalkoxysilanes, or by adding adhesion-promoting substances to the coating solutions.

Thus, DE-A 41 07 664 describes solutions of polycondensates having nitrogen-heterocyclic structural units, to which azidosilanes are added as adhesion promoters.

A further requirement for such polyimide coatings is very low water absorption, in order to ensure functioning of the microchips even under humid conditions. Since the imide group is known to be hydrophilic, attempts have been made to compensate this by the use of very hydrophobic polyimides, for example by using starting materials having a very high molecular weight in order to reduce the imide group density in the polymer.

It is also desirable to obtain structurable polyimide coatings. For this purpose, the polyimide layers are first predried and then coated with a photoresist. Imagewise exposure is then effected through a mask and, as a rule, development is then carried out with dilute aqueous alkali solutions. As a result, the photoresist can be removed in the exposed parts. In the next step, the polyimide coat, too, is then removed from the developed parts, and the predried polyimide layer is structured in this manner. For structuring under photoresists with aqueous alkaline developers, the polyimide intermediates must be predried to such an extent that they are no longer attacked by the photoresist or the solvents present therein.

However, particularly when polyimide intermediates which can be cured to give polyimides having low water absorption are used, problems are encountered in the development because, after sufficient predrying, said polyimides can no longer be dissolved by aqueous alkaline developers.

SUMMARY OF THE INVENTION

It is an object of the present invention to provide improved polyimide coatings.

We have found that this object is achieved by the solutions of polyimide-forming substances containing A) polyamines and B) amides or esters or a mixture of amides and esters of tetracarboxylic acids, the amide or ester groups carrying substituents selected from the group consisting of carboxyl, sulfo, silyl and siloxyl groups.

DESCRIPTION OF THE PREFERRED EMBODIMENTS

The technically most important polyheterocycles for the purposes of the present invention are polyimides, but other polyheterocycles, such as polyisoindoloquinazolinediones or polyarylenebenzimidazoles, are also included. The term polyimide is used below as a synonym for all N-containing polyheterocycles.

The individual components of the solutions are described below.

Preferred polyamine components A) are aromatic and/or partly aromatic polyamines, diamines, very particularly aromatic diamines, being preferred.

p-phenylenediamine,
m-phenylenediamine,
4,4'-diaminodiphenyl oxide,
3,3'-diaminodiphenyl oxide,
3,4'-diaminodiphenyl oxide,
4,4'-diaminodiphenyl sulfide,
3,3'-diaminodiphenyl sulfide,
3,4'-diaminodiphenyl sulfide,
4,4'-diaminodiphenyl sulfone,
3,3'-diaminodiphenyl sulfone,
3,4'-diaminodiphenyl sulfone,
(4,4'-diaminodiphenyl)-methane,
(3,3'-diaminodiphenyl)-methane,
(3,4'-diaminodiphenyl)-methane,
(4,4'-diaminodiphenyl)-propane,
(3,3'-diaminodiphenyl)-propane,
(3,4'-diaminodiphenyl)-propane,
(4,4'-diaminodiphenyl)-ethane,
(3,3'-diaminodiphenyl)-ethane,
(3,4'-diaminodiphenyl)-ethane,
4,4'-bis-(4,4'-aminophenoxy)-biphenyl,
4,4'-bis-(4,3'-aminophenoxy)-biphenyl,
2,2-bis[4-(4,4-aminophenoxy)phenyl]-propane,
2,2-bis[4-(4,4-aminophenoxy)phenyl]-perfluoropropane,
2,2-bis[4-(3,4-aminophenoxy)phenyl]-propane,
2,2-bis[4-(3,3'-aminophenoxy)phenyl]-propane,
2,2-bis[4-(4,4'-aminophenoxy)phenyl]sulfone,
2,2-bis[4-(3,4-aminophenoxy)phenyl]sulfone,
2,2-bis[4-(3,3'-aminophenoxy)phenyl]sulfone,
4,4'-dimethyl-3,3'-diaminodiphenyl sulfone,
2,2-bis[4-(4,4'-aminophenoxy)phenyl]sulfide,
2,2-bis[4-(3,4-aminophenoxy)phenyl]sulfide,
2,2-bis[4-(3,3'-aminophenoxy)phenyl]sulfide,
2,2-bis[4-(4,4'-aminophenoxy)phenyl]-methane,
2,2-bis[4-(3,4-aminophenoxy)phenyl]-methane,
2,2-bis[4-(3,3'-aminophenoxy)phenyl]-methane,
1,4-bis-(4,4'-aminophenoxy)-phenylene,
1,4-bis-(3,4'-aminophenoxy)-phenylene,
1,4-bis-(3,3'-aminophenoxy)-phenylene,
4,4'-diaminobiphenyl (benzidine),
3,4'-diaminobiphenyl, 3,3'-diaminobiphenyl,
3,3'-dimethoxy-4,4'-diaminobiphenyl,
3,3'-dimethoxy-3,4'-diaminobiphenyl,
3,3'-dimethyl-4,4'-diaminobiphenyl,
3,3'-dimethyl-3,4'-diaminobiphenyl,
1,8-diaminonaphthalene, 1,5-diaminonaphthalene,
p-terphenyl-4,4"-diamine, p-terphenyl-3,3"-diamine,
5-tert-butyl-2,4-toluylenediamine,
3-tert-butyl-2,6-toluylenediamine,
3,5-diethyl-2,4-toluylenediamine,
3,5-diethyl-2,6-toluylenediamine,
alkylisopropyltoluylenediamines, such as diisopropyltoluylenediamine,
α,ω-diamino-(polyphenylenesulfides),
m-xylylenediamine,
p-xylylenediamine,
bis-4,4'-[(2,6-diisopropyl)aminophenyl]methane,
bis-4,4'-[(2-methyl-6-isopropyl)aminophenyl]methane,
bis-4,4'-[(2,6-dimethyl)aminophenyl]methane,
bis-4,4'-[(2,6-diisopropyl)aminophenyl] ether,
bis-4,4'-[(2-methyl-6-isopropyl)aminophenyl] ether or
bis-4,4'-[(2,6-dimethyl)aminophenyl] ether.

Other suitable polyamines are tetraamines, such as 3,3',4,4'-tetraaminodiphenyl, 3,3',4,4'-tetraaminodiphenylmethane, 3,3',4,4'-tetraaminodiphenyl ether, 3,3',4,4'-tetraaminodiphenylsulfone or 3,3',4,4'-tetraaminodiphenyl sulfide. Such tetraamines give polyarylenebenzindazoles as a final structure.

A further important group of diamines comprises aromatic polynuclear compounds which are bonded via benzanilide groups, e.g. 3,3'-diaminobenzanilide, 3,4'-diaminobenzanilide, 4,3'-diaminobenzanilide, 4,4'-diaminobenzanilide or 4,3'-diaminobenzanilide, and the N-alkyl substitution products of these anilides, as well as the α,ω-diaminopolyanilides according to EP-A-271736.

As a rule, polyimides having the best possible combinations of properties are desirable. These are obtained in general by means of a wholly aromatic structure. The novel polyimides are therefore preferably prepared using purely aromatic diamines.

Although diamines which are not purely aromatic generally adversely affect the thermal stability of the end products, cycloaliphatic, heterocyclic and aliphatic amine compounds having an amine functionality greater than 1, preferably equal to 2 or more, may however also be used or may be present for obtaining specific properties, for example surface smoothness, flexibility, etc.

These are, for example, diamino(dimethyl)dicyclohexylmethane, diamino(dimethyldiisopropyl)dicyclohexylmethane, diamino (tetra isopropyl)dicyclohexylmethane, diamino(diisopropyl)dicyclohexylmethane, diaminoalkylenes or diaminopolyoxyalkylenes.

The term diamines is also intended to include compounds which contain the structural element N-N, ie. derivatives of hydrazine.

Aromatic diamines which are further substituted in the nucleus by reactive groups are also important. Such reactive substituents are, for example, carboxyl, hydroxyl, amino and amido groups. Polyheterocycles having a non-imide structure are then also formed with such substituted amines. In the case of the o-carboxamidoamines, for example anthranilamide, polyisoindoloquinazolinediones are obtained as the final structure. Dihydroxydiamines give polybenzoxazoles and tetraamines result in polyarylenebenzimidazoles. The present invention also relates to such polymers.

According to the invention, salts and partial salts of the amines may also be used or may be present, for example the carbonates, acetates, trifluoroacetates, trichloroacetates, formates, oxalates, maleates, methanesulfonates, benzenesulfonates, chlorides, etc. It has been found that the use of such salts suppresses the strong discoloration, particularly of the aromatic diamines, and gives smoother films in the case of some combinations.

The stated starting materials are known or can be prepared by conventional processes.

The starting materials are listed only by way of example, and the invention is not restricted to the use of these substances.

According to the invention, esters or amides or mixtures of esters and amides of tetracarboxylic acids, which are obtainable by reacting tetracarboxylic acids or, preferably, tetracarboxylic dianhydrides with compounds having hydroxyl and/or amine functional groups and carrying at least one substituent from the group consisting of carboxyl, sulfonyl, silyl and siloxyl groups are used as components B).

To introduce the carboxyl or sulfonyl groups, tetracarboxylic dianhydrides are preferably reacted with monohydroxy compounds and/or primary monoamines and/or secondary monoamines.

Suitable monohydroxy compounds are in particular aliphatic and aromatic hydroxycarboxylic acids or hydroxysulfonic acids, for example glycolic acid and lactic acid, and hydroxy-fatty acids, such as butyric acid or valeric acid, aromatic hydroxycarboxylic acids, such as salicylic acid, hydroxyalkanesulfonic acids, such as 1-hydroxyethylsulfonic acid or 1-hydroxypropanesulfonic acid, and aromatic sulfonic acids, such as the hydroxybenzenesulfonic acids or the toluenesulfonic acids.

Particularly suitable monoamine components are aminocarboxylic acids or aminosulfonic acids. Examples of suitable aminocarboxylic acids are saturated aminocarboxylic acids, such as aminoacetic acid, α-aminopropanecarboxylic acid, β-aminopropanecarboxylic acid or higher homologs of the antino-fatty acids, and aromatic aminocarboxylic acids, such as o-aminobenzoic acid. Suitable aminosulfonic acids are aminoethanesulfonic acid, aminopropenesulfonic acid or aromatic sulfonic acids, such as o-aminobenzenesulfonic acid.

The silyl or siloxyl groups are likewise introduced via compounds having hydroxyl or amino functional groups, for example
aminoalkylalkoxysilanes, such as
aminoethyltris(trimethylsiloxy)silane,
4-aminobutyltrialkoxysilanes,
4-aminobutylmethyldialkoxysilanes,
4-aminobutyldimethylalkoxysilanes,
3-aminopropyltriethoxysilane,
3-aminopropyldiethoxymethylsilane,
3-aminopropylethoxydimethylsilane,
aminoethyltriethoxysilane,
aminoethyldiethoxymethylsilane,
aminoethylethoxydimethylsilane,
aminopropyltrimethoxysilane,
aminopropyldimethoxymethylsilane,
aminopropylmethoxydimethylsilane,
aminoethyltrimethoxysilane,
aminoethyldimethoxymethylsilane,
aminoethylmethoxydimethylsilane,
(aminoethylaminomethyl)phenylethyltrimethoxysilane,
N-(2-aminoethyl)-3-aminopropylmethyldimethoxysilane,
N-(2-aminoethyl)-3-aminopropyltrimethoxysilane,
3-(3-aminophenoxy)propyltrimethoxysilane,
3-(4-aminophenoxy)propyltrimethoxysilane,
aminophenyltriethoxysilanes as various isomers,
aminophenyltrimethoxysilanes as various isomers,
3-aminopropyltris(trimethylsiloxy)silane,
1,3-bis(4-aminobutyl)tetramethyldisiloxane,
bis(p-aminophenoxy)dimethylsilane,
1,3-bis(3-aminopropyl)-1,1,3,3-tetramethyldisiloxane,
(cyclohexylaminomethyl)methyldiethoxysilane, (cyclohexylaminomethyl)triethoxysilane,
(cyclohexylaminomethyl)dimethylethoxysilane,
(N-ethyl-3-aminopropyl)trimethoxysilane,
1,3-bis(4-hydroxybutyl)tetramethyldisiloxane,
1,4-bis(hydroxydimethylsilyl)tetramethyldisiloxane,
bis(2-hydroxyethyl)-3-aminopropyltriethoxysilane,
1,3-bis(3-hydroxypropyl)tetramethyldisiloxane,
tert-butylaminotriethylsilane,
tert-butylaminotrimethylsilane,
(cyclohexylaminomethyl)methyldiethoxysilane or amino-terminated oligomeric siloxanes having a molecular weight of up to 2000 or hydroxyl-terminated oligomeric siloxanes having a molecular weight of up to 2000.

Preferably used silyl or siloxyl compounds are aminopropyltriethoxysilane and tert-butylaminoethylsilane.

The novel tetracarboxylic esters and/or amides may be modified either only with acidic groups, such as carboxyl or sulfonyl, or only with silyl or siloxyl groups or, preferably, with acidic and silicon-containing groups. Unless all amido or ester groups are substituted in this manner, alcohols and/or primary and/or secondary amines which carry no such groups are additionally reacted as compounds having hydroxyl and/or amino functional groups. Particularly suitable alcohols are $C_1$–$C_8$-alkanols, such as methanol, ethanol, propanol, isopropanol, n-butanol, isobutanol, n-pentanol and its isomers, n-hexanol and its isomers and 2-ethylhexanols, and furthermore cycloalkyl alcohols, such as cyclohexanol, aromatic alcohols, such as phenol, kresol or cumol, and alkoxyaryl alcohols, such as 3-phenoxypropanol or 2-phenoxyethanol, and polyalkoxyglycol ethers and polyalkoxyglycol esters or mixtures thereof.

The proportion of amido or ester groups which are substituted by the stated functional groups depends on the required performance characteristics.

In order to achieve good wet developability by substitution with acidic groups, such as carboxyl or sulfonyl, it is advisable to use from 10 to 100, preferably from 20 to 50, mol %, based on the total amount of compounds used which have functional amino or hydroxyl groups.

In order to achieve good adhesion, it is advisable to use 0.5–30, preferably 5–25, mol %, based on the total amount of compounds used which have OH and amino functional groups, of silyl or siloxyl-substituted compounds having amino or hydroxyl functional groups.

Suitable amines are primary and/or secondary saturated $C_1$–$C_8$-monoamines, such as ethylamine, 1-aminopropane, 2-aminopropane, dimethylamine, ethylmethylamine or diethylamine, or aromatic monoamines, such as aniline or toluidine.

The tetracarboxylic acid components used are in particular the dianhydrides of the tetracarboxylic acids stated below.

Aromatic and partly aromatic tetracarboxylic acids, such as
pyromelitic acid,
benzene-1,2,3,4-tetracarboxylic acid,
3,3',4,4'-biphenyltetracarboxylic acid,
2,2',4,4'-biphenyltetracarboxylic acid,
2,3,3',4'-biphenyltetracarboxylic acid,
2,2',3,3'-benzophenonetetracarboxylic acid,
2,3,3',4'-benzophenonetetracarboxylic acid,
2,3,6,7-naphthalenetetracarboxylic acid,
1,2,5,6-naphthalenetetracarboxylic acid,
1,2,4,5-naphthalenetetracarboxylic acid,
1,4,5,8-naphthalenetetracarboxylic acid,
1,2,6,7-naphthalenetetracarboxylic acid,
2,6-dichloronaphthalene-1,4,5,8-tetracarboxylic acid,
2,7-dichloronaphthalene-1,4,5,8-tetracarboxylic acid,
2,3,6,7-tetrachloronaphthalene-1,4,5,8-tetracarboxylic acid,
1,4,5,8-tetrachloronaphthalene-2,3,6,7-tetracarboxylic acid,
4,8-dimethyl-1,2,3,5,6,7-hexahydronaphthalene-1,2,5,6-tetracarboxylic acid,
4,8-dimethyl-1,2,3,5,6,7-hexahydronaphthalene-2,3,6,7-tetracarboxylic acid,
4,4'-oxydiphthalic acid,
3,3'-oxydiphthalic acid,
4,4'-sulfonyldiphthalic acid,
4,4'-thiodiphthalic acid,
3,3'-thiodiphthalic acid,
4,4'-acetylidenediphthalic acid,
bis(2,3-dicarboxyphenyl)methane,
bis(3,4-dicarboxyphenyl)methane,
1,1-bis(2,3-dicarboxyphenyl)ethane,
1,1-bis(3,4-dicarboxyphenyl)ethane,
2,2-bis(2,3-dicarboxyphenyl)propane,
2,2-bis(3,4-dicarboxyphenyl)propane,
phenanthrene-1,2,7,8-tetracarboxylic acid,
phenanthrene-1,2,6,7-tetracarboxylic acid,
phenanthrene-1,2,9,10-tetracarboxylic acid,
2,3,9,10-perylenetetracarboxylic acid,
3,4,9,10-perylenetetracarboxylic acid,
2,3,8,9-perylenetetracarboxylic acid,
4,5,10,11-perylenetetracarboxylic acid,
3,3",4,4"-p-terphenyltetracarboxylic acid,
2,2",3,3"-p-terphenyltetracarboxylic acid or
2,3,3",4"-p-terphenyltetracarboxylic acid, are preferred.

Butane-1,2,3,4-tetracarboxylic acid, cyclobutanetetracarboxylic acid, cyclopentane-1,2,3,4-tetracarboxylic acid, pyrrolidine-2,3,4,5-tetracarboxylic acid, thiophene-2,3,4,5-tetracarboxylic acid, pyrazine-2,3,5,6-tetracarboxylic acid, tetrahydrofurantetracarboxylic acid, 9-bromo-10-mercaptoanthracenetetracarboxylic acid, 9,10-dimercaptoanthracenedicarboxylic acid, 2,6-endovinylenecyclohexane-1,2,4,5-tetracarboxylic acid and hexafluoroisopropylidene-2,2-bis(phthalic anhydride) are also suitable.

Other suitable isomers and substitution products of the stated polycarboxylic acids are halogen substitution products, in particular fluorine or perfluoro substitution products, and/or alkyl substitution products and polycarboxylic acids containing silicon.

The dimerization and oligomerization products of trimelitic anhydride with alcohols, amines and isocyanates having a functionality of >2 and especially the 4,4 esterification, 4,4 etherification and 4,4 amidation dimers of trimelitic acid are also suitable. According to the invention, the salts or partial salts of the tetracarboxylic acid compounds may also be used or concomitantly used, provided that they still have free carboxyl groups, for example ammonium salts and salts with readily volatile amines, such as mono-, di- and trimethylamine, mono-, di- and triethylamine and other amines. The phosphonium and sulfonium salts of acidic tetracarboxylic acid compounds may also be used or concomitantly used. The use of such salts generally leads to desired lower viscosities in conjunction with a higher solids content.

The tetracarboxylic acids stated are known or can be prepared by known processes.

Mixtures of tetracarboxylic dianhydrides are also suitable.

The tetracarboxylic esters and amides may be prepared by conventional methods. The anhydride rings are cleaved by reaction with the compounds having hydroxyl or amino functional groups, an ester or amido group and a carboxyl group initially being formed from an anhydride ring. Whether further esterification/amidation takes place depends, as is known, on the reaction temperature; at from 50° to 150° C., only the diesters or diamides are usually formed, whereas at higher temperatures of up to 200° C. tri or tetra derivatives may also be formed. Mono derivatives are formed only in minor amounts. The transesterification/amidation can be carried out in the presence of catalysts, such as dimethylaminopyridine or p-tolulenesulfonic acids.

Diesters or diamides or mixtures thereof are preferably prepared. The diesters or diamides may be prepared simultaneously or separately. The amount of hydroxy or amino component employed is preferably such that from 0.5 to 3, preferably from 1.5 to 2.5, mol of the hydroxy and amine component are used per mole of tetracarboxylic acid or tetracarboxylic dianhydride. Equivalent amounts are particularly preferably used, ie. 2 mol of alcohol or amine or 2 mol of alcohol/amine mixture per mole of tetracarboxylic acid or tetracarboxylic dianhydride.

According to the invention, ester/amide mixtures may be used, and the amount of amide may be from 5 to 40, preferably from 5 to 20, mol %.

The novel intermediates are, as a rule, synthesized in suitable organic solvents, preferably polar substances, such as
formamide,
acetamide,
N-methylformamide,
N,N-dimethylformamide,
N,N-diethylformamide,
N-methylpyrrolidone,
dialkylacetamides, such as
N,N-dimethylacetamide or
N,N-diethylacetamide,
alkylalkylenediureas, such as
dimethylethylenediurea or
dimethylpropylenediurea,
alkyleneureas, such as
ethylenediurea or
propylenediurea,
butyrolactone,
caprolactam,
pyrrolidone,
N-alkylpyrrolidones, such as
N-methylpyrrolidone (NMP),
N-ethylpyrrolidone,
N-cyclohexylpyrrolidone or
N-acetylpyrrolidone, and
dimethyl sulfoxide,
dimethyl sulfone, or
hexamethylenephosphorotriamide.

These polar substances may be completely or partially replaced by further solvents, such as alcohols, esters, ketones, ethers and cycloaliphatic ketones, alcohols, esters, amines, especially tertiary amines, such as triethylamine, water, glycols, glycol esters, glycol ethers and hydrocarbons. The choice of solvent depends on the solubility of the other substances and on the desired concentration and viscosity and has to be optimized in the individual case. In some cases, the tetracarboxylic acid compounds, too, are relatively low-viscosity liquids, so that it is possible to employ no additional solvent or only a very small amount of additional solvent and thus produce polyimide coatings having an extremely high solids content.

The novel solutions contain the polyamine A) and the tetracarboxylic acid derivatives B) preferably in a molar ratio of from 1.5:1 to 1:1.5, particularly preferably 1:1.

The novel solutions may also contain free tetracarboxylic acids. These may be added separately or may be produced in the solution by adding water.

The solids content of the solutions is preferably from 35 to 60% by weight. The viscosities are preferably from 500 to 10,000 mPa.s. For special applications, however, the desired parameters can be adjusted as required by corresponding dilution.

For the preparation of the solutions, tetracarboxylic acid derivatives, polyamine and solvent may be combined in any order. For example, it is possible thus to prepare the tetracarboxylic acid derivatives and to add the diamine and, if required, a further solvent to the mixture obtained. In order to dissolve all components, if necessary stirring is carried out at room temperature or at elevated temperatures, for example from 30° to 120° C., in particular from 40° to 80° C.

The novel solutions may contain conventional additives, such as catalysts for the imide formation, dyes, pigments, fillers, levelling agents and viscosity regulators.

They are suitable as coating materials for the production of coatings on a very wide range of substrates, for example metal, glass or silicon. The coating is preferably cured at final temperatures of from 150° to 450° C., particularly preferably from 300° to 400° C. It has proven particularly advantageous to carry out the curing process in a plurality of stages by gradually increasing the temperature to the final temperature.

The novel solutions are used for coating silicon wafers for the production of electronic circuits, ceramic and metal for the production of composite circuits, in particular for the production of multi-chip modules, for coating wire, for coating optical waveguides of glass or quartz, for coating metal films for the production of flexible printed circuit boards, for coating, impregnating and adhesively bonding ordered and random, sheet-like and formed fibrous materials, for encapsulating electronic and electric circuits and windings and for the production of powders, fibers, free films or moldings.

The novel solutions can be used to produce coatings which can be developed very readily in an alkaline aqueous medium and exhibit little water absorption.

Furthermore, the novel coatings which contain polyimides modified with organosilicon groups have such good adhesion to the substrate that it is possible to dispense with the use of adhesion promoters.

Novel coatings which contain polyimides modified with acidic and organosilicon groups have good wet developability in conjunction with good adhesion.

A further advantage of the novel solutions is the relatively low viscosity in combination with a high solids content, with the result that blister formation is avoided during baking of the coatings.

The examples which follow illustrate the invention.

EXAMPLES

| Abbreviations: | |
| --- | --- |
| ODPA | Oxydiphthalic dianhydride |
| BAPP | 2,2-Bis[(4-aminophenoxy)phenyl]propane |
| MPG | Ethylene glycol monophenyl ether |
| NMP | N-Methylpyrrolidone |
| DMAP | Dimethylaminopyridine |
| APTES | Aminopropyltriethoxysilane |
| DADO | Diaminodiphenyl oxide (bis[4-aminophenyl] oxide) |

General method for the preparation of the solutions of polyimide-forming substances.

In the Examples and Comparative Examples which follow, the ester and/or amide of the tetracarboxylic acids are first prepared by reacting the tetracarboxylic anhydrides with the compounds having hydroxyl and/or amino functional groups by stirring at 120° C. (30 minutes) in the presence of DMAP as a catalyst and of the first portion of the solvent. After cooling to 60° C., the diamines (component A) and, if required, further solvent are added and the mixture is stirred until a solution has formed.

Comparative Example (VB):

| Stir | | |
|---|---|---|
| 93.08 g of ODPA | (0.30 mol) | |
| 82.80 g of MPG | (0.60 mol) | |
| 100.00 g of NMP | | |
| 0.50 g of DMAP | | for 30 minutes at 120° C., cool to 60° C., add a suspension of |
| 123.15 g of BAPP | (0.30 mol) and | |
| 100.00 g of NMP, | | stir for a further 60 minutes at 60° C. and cool. |

Example 1 (B1):

| Stir | | |
|---|---|---|
| 93.08 g of ODPA | (0.30 mol) | |
| 69.00 g of MPG | (0.50 mol) | |
| 7.71 g of aminoacetic acid | (0.10 mol) | |
| 100.00 g of NMP | | |
| 00.50 g of DMAP | | for 30 minutes at 120° C., cool to 60° C., add a suspension of |
| 23.15 g of BAPP | (0.30 mol) add | |
| 100.00 g of NMP | | for 60 minutes at 60° C. and cool. |

Example 2 (B2):

| Stir | | |
|---|---|---|
| 93.08 g of ODPA | (0.30 mol) | |
| 55.20 g of MPG | (0.40 mol) | |
| 14.42 g of aminoacetic acid | (0.20 mol) | |
| 100.00 g of NMP | | |
| 00.50 g of DMAP | | for 30 minutes at 120° C., cool to 60° C., add a suspension of |
| 23.15 g of BAPP | (0.30 mol) and | |
| 100.00 g of NMP, | | stir for a further 60 minutes at 60° C. and cool. |

Example 3 (B3):

| Stir | | |
|---|---|---|
| 93.08 g of ODPA | (0.30 mol) | |
| 41.40 g of MPG | (0.30 mol) | |
| 23.13 g of aminoacetic acid | (0.30 mol) | |
| 100.00 g of NMP | | |
| 00.50 g of DMAP | | for 30 minutes at 120° C., cool to 60° C., add a suspension of |
| 123.15 g of BAPP | (0.30 mol) and | |
| 100.00 g of NMP, | | stir for a further 60 minutes at 60° C. and cool. |

Example 4 (B4):

| Stir | | |
|---|---|---|
| 93.08 g of ODPA | (0.30 mol) | |
| 55.20 g of MPG | (0.40 mol) | |
| 15.21 g of glycolic acid | (0.20 mol) | |
| 100.00 g of NMP | | |
| 00.50 g of DMAP | | for 30 minutes at 120° C., cool to 60° C., add a suspension of |
| 123.15 g of BAPP | (0.30 mol) and | |
| 100.00 g of NMP, | | stir for a further 60 minutes at 60° C. and cool. |

Example 5 (B5):

| Stir | | |
|---|---|---|
| 93.08 g of ODPA | (0.30 mol) | |
| 55.20 g of MPG | (0.40 mol) | |
| 20.47 g of (88% strength lactic acid) | (0.20 mol) | |
| 100.00 g of NMP | | |
| 00.50 g of DMAP | | for 30 minutes at 120° C., cool to 60° C., add a suspension of |
| 123.15 g of BAPP | (0.30 mol) and | |
| 100.00 g of NMP, | | stir for a further 60 minutes at 60° C. and cool. |

Example 6 (B6):

| Stir | | |
|---|---|---|
| 93.08 g of ODPA | (0.30 mol) | |
| 62.10 g of MPG | (0.45 mol) | |
| 33.21 g of APTES | (0.15 mol) | |
| 100.00 g of NMP | | |
| 00.50 g of DMAP | | for 30 minutes at 120° C., cool to 60° C., add a suspension of |
| 123.15 g of BAPP | (0.30 mol) and | |
| 100.00 g of NMP, | | stir for a further 60 minutes at 60° C. and cool. |

Example 7 (B7):

| Stir | | |
|---|---|---|
| 93.08 g of ODPA | (0.30 mol) | |
| 62.10 g of MPG | (0.45 mol) | |
| 33.21 g of APTES | (0.15 mol) | |
| 100.00 g of NMP | | |
| 00.50 g of DMAP | | for 30 minutes at 120° C., cool to 60° C., add a suspension of |
| 123.15 g of BAPP | (0.30 mol) and | |
| 90.00 g of NMP, | | stir for a further 10 minutes at 60° C., add |
| 10.00 g of water, | | stir for a further 50 minutes at 60° C. and cool. |

Example 8 (B8):

| Stir | | |
|---|---|---|
| 93.08 g of ODPA | (0.30 mol) | |
| 34.50 g of MPG | (0.25 mol) | |
| 33.21 g of APTES | (0.15 mol) | |
| 14.42 g of aminoacetic acid | (0.20 mol) | |
| 100.00 g of NMP | | |
| 00.50 g of DMAP | | for 30 minutes at 120° C., cool to 60° C., add a suspension of |
| 123.15 g of BAPP | (0.30 mol) in | |
| 100.00 g of NMP, | | stir for a further 60 minutes at 60° C. and cool. |

Example 9 (B9):

| Stir | | |
|---|---|---|
| 93.08 g of ODPA | (0.30 mol) | |
| 34.50 g of MPG | (0.25 mol) | |
| 33.21 g of APTES | (0.15 mol) | |
| 14.42 g of aminoacetic acid | (0.20 mol) | |
| 100.00 g of NMP | | |
| 00.50 g of DMAP | for 30 minutes at 120° C., cool to 60° C., add a suspension of | |
| 123.15 g of BAPP | (0.30 mol) in | |
| 90.00 g of NMP, | stir for a further 10 minutes at 60° C., add | |
| 10.00 g of water, | stir for a further 50 minutes at 60° C. and cool. | |

Testing of substrates coated with the polyimide solutions (PI coatings).

Determination of the minimum predrying and of the wet developability.

The PI coatings must be predried to such an extent that they are not dissolved on the surface by the photoresists or the solvents of the photoresists. Important solvents of such photoresists are 2-acetoxy-1-methoxypropane and 2-ethoxyethyl acetate. For these solvents, the minimum drying (MD) was therefore determined as the drying after which the coatings showed no change after 5 minutes under a cotton-wool ball moistened with the solvent.

To test the developability, the coatings were then applied to sheet metal strips with a knife coater having a gap height of 100 µm and were subjected to the minimum predrying in a through-circulation dryer, after which a layer thickness of about 30 µm was obtained.

Development was effected in a beaker with a magnetic stirrer at 25° C. The sheet metal strips were about half immersed in the developer.

After five minutes, the samples were rinsed off with water and blown dry with compressed air, and the difference between the immersed and non-immersed part was determined as removal of material using a magnetic layer thickness measuring instrument.

The developers used were 0.25 and 0.4 normal aqueous solutions of tetramethylammonium hydroxide (TMAH).

The results are listed in Table I.

TABLE I

| Coatings Ex. No. | Minimum predrying | | Removal rate during MD | |
|---|---|---|---|---|
| | Time [min] | Temperature [°C.] | 0.25 N TMEH [µm/min] | 0.40 N TMEH [µm/min] |
| VB | 35 | 130 | 0 | 0 |
| B1 | 40 | 130 | 1.2 | 2.8 |
| B2 | 40 | 135 | 1.9 | 3.6 |
| B3 | 45 | 135 | 2.8 | 5.3 |
| B4 | 30 | 135 | 0.8 | 2.1 |
| B5 | 30 | 135 | 1.3 | 3.2 |
| B6 | 35 | 140 | 0 | 0 |
| B7 | 35 | 140 | 0 | 0 |
| B8 | 30 | 130 | 3.1 | 4.4 |
| B9 | 30 | 130 | 2.9 | 4.7 |

Adhesion test

Test substrates

Test substrate Si: brand new, polished wafers of very pure silicon

Test substrate O: brand new wafers oxidized to $SiO_2$ at their surface in oxygen plasma Test substrate Si/HV: brand new wafers wet with an adhesion promoter solution comprising 0.01% of 3-aminopropyltriethoxysilane in 95:5 methanol/water and dried for 10 minutes at 150° C. in a through-circulation dryer Test substrate O/HV: oxidized wafers aftertreated with adhesion promoter as in the case of Si/HV Production of the test specimens The PI coatings are applied to the test substrates on a spin coater. The speed is adjusted so that layer thicknesses of from 15 to 18 µm result after the drying process. After application of the coatings by spincoating, the wafers are heated to 360° C. under reduced pressure on heatable plates at a heating rate of 10° C./minute. After the final temperature has been reached, the oven is switched off. After about 4 hours, the plates have reached room temperature and the wafers are removed for testing.

The test specimens are stored first for 48 hours at room temperature and then in a steam sterilizer for 24 hours at 121° C. and 1 bar in the steam space (pressure cooker test). Immediately after removal, the test specimens are dried off with with absorptive paper. The coating is then scratched in a crosshatch with a spacing of 1 mm using a sharp knife, down to the wafer surface. A self-adhesive film is stuck over this crosshatch and is pulled off again. In the case of good adhesion, the coating remains completely adhering to the wafer, whereas in the case of poor adhesion parts of the crosshatch are removed and in the case of very poor adhesion the complete coating is removed.

The evaluation is based on ratings, ratings from 2 to 4 being intermediate stages between 1=perfect adhesion and 5=complete loss of adhesion.

The results of the adhesion test are listed in Table II.

TABLE II

| Examples Coating No. | Adhesion ratings on substrates | | | |
|---|---|---|---|---|
| | Si | O | Si/HV | O/HV |
| VB | 5 | 5 | 1–2 | 1 |
| B1 | 5 | 5 | 1 | 1 |
| B2 | 5 | 5 | 1 | 1 |
| B3 | 5 | 5 | 1 | 1 |
| B4 | 5 | 5 | 1 | 1 |
| B5 | 5 | 5 | 1–2 | 1–2 |
| B6 | 2 | 1 | 1 | 1 |
| B7 | 1 | 1 | 1 | 1 |
| B8 | 2 | 1 | 1 | 1 |
| B9 | 1 | 1 | 1 | 1 |

Mechanical properties of the polyimide coatings

The coatings were applied to glass sheets with a knife coater having a gap height of 100 µm and were heated to 350° C. under reduced pressure in an oven at a heating rate of 5° C./minute, and the oven was then switched off. After cooling, the glass sheets were placed in water, which was then brought to the boil; the films became detached from the glass.

The free films were dried at 140° C. in a through-circulation oven. The IR spectra of the dry films were compared and were found to be virtually identical except for small deviations due to the measuring technique. The mechanical properties of the films were determined by means of a tensile test. The data in the table are the result of the statistical evaluation of eight individual measurements in each case.

Furthermore, the free films were stored at 98% humidity until their weight remained constant, and the water absorption was determined in this manner. The data in Table III are the mean of three tests in each case.

TABLE III

| Coating | Tensile strength [N/mm$^2$] | Elongation at break [%] | Modulus of elasticity [N/mm$^2$] | Water absorption [% by weight] |
|---------|---|---|---|---|
| VB | 89.4 | 31.3 | 2586 | 0.93 |
| B1 | 93.2 | 36.3 | 2678 | 0.89 |
| B2 | 90.7 | 29.1 | 2733 | 0.96 |
| B3 | 94.4 | 33.6 | 2774 | 0.91 |
| B4 | 88.9 | 28.5 | 2557 | 0.88 |
| B5 | 87.3 | 34.0 | 2689 | 0.92 |
| B6 | 92.4 | 27.7 | 2712 | 1.14 |
| B7 | B8.7 | 33.4 | 2522 | 0.97 |
| B8 | 91.6 | 29.4 | 2669 | 1.21 |
| B9 | 89.6 | 34.4 | 2512 | 0.93 |

The Examples show that polyimides having good mechanical properties comparable to those of VB are obtained with the novel coatings. The water absorption, too, is comparable with that of VB; the differences are within the error of measurement.

We claim:

1. A solution of a polyimide-forming substance, containing

A) polyamines and

B) amides or esters or mixtures of amides and esters of tetracarboxylic acids, the amido or ester groups carrying substituents selected from the group consisting of carboxyl, sulfo, silyl and siloxyl groups.

2. A solution as defined in claim 1, containing, as components A), aromatic or partly aromatic diamines.

3. A solution as defined in claim 1, containing, as components B), diamides, diesters or mixtures of diamides and diesters of tetracarboxylic acids.

4. A solution as defined in claim 1, containing components B) which are obtained by reacting tetracarboxylic anhydrides with compounds having amino or hydroxyl functional groups or mixtures of said compounds, which are selected from the group consisting of the hydroxycarboxylic acids, aminocarboxylic acids, hydroxysulfonic acids, aminosulfonic acids, hydroxyl-substituted silanes and siloxanes and the amino-substituted silanes and siloxanes.

5. An article coated with a polyimide and obtained using a solution as defined in claim 1 as a coating material.

* * * * *

UNITED STATES PATENT AND TRADEMARK OFFICE
CERTIFICATE OF CORRECTION

PATENT NO.: 5,493,003

DATED: February 20, 1996

INVENTOR(S): BLUM et al.

It is certified that error appears in the above-identified patent and that said Letters Patent is hereby corrected as shown below:

On the cover page, in lieu of the statement pertaining to the expiration date by way of a terminal disclaimer, the notice should read as follows:

--[*] Notice: This patent is subject to a terminal disclaimer.--

Signed and Sealed this

Seventh Day of September, 1999

Attest:

Q. TODD DICKINSON

Attesting Officer

Acting Commissioner of Patents and Trademarks